US011458655B2

(12) United States Patent
Balka

(10) Patent No.: US 11,458,655 B2
(45) Date of Patent: Oct. 4, 2022

(54) METHOD FOR FINDING A TARGET CONVEYING CAPACITY OF A PUMPING SYSTEM

(71) Applicant: ENGEL AUSTRIA GmbH, Schwertberg (AT)

(72) Inventor: Christoph Balka, Schwertberg (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 1018 days.

(21) Appl. No.: 15/782,042

(22) Filed: Oct. 12, 2017

(65) Prior Publication Data

US 2018/0104864 A1    Apr. 19, 2018

(30) Foreign Application Priority Data

Oct. 14, 2016 (AT) .............................. A 50925/2016

(51) Int. Cl.
*F04D 15/00* (2006.01)
*B29C 35/02* (2006.01)
(Continued)

(52) U.S. Cl.
CPC .......... *B29C 35/0294* (2013.01); *B29C 33/04* (2013.01); *B29C 35/007* (2013.01);
(Continued)

(58) Field of Classification Search
CPC ... B29C 33/04; B29C 35/007; B29C 35/0294; B29C 45/73; B29C 45/76; F04D 27/00; F04D 27/003; F04D 27/004; F04D 27/007
See application file for complete search history.

(56) References Cited

U.S. PATENT DOCUMENTS 9,662,828 B2   5/2017   Hollriegl et al.
9,908,267 B2   3/2018   Raschke et al.
(Continued)

FOREIGN PATENT DOCUMENTS

AT     513870     12/2014
CN    102132224    7/2011
(Continued)

OTHER PUBLICATIONS

Extended European Search Report dated Mar. 14, 2018 in European Application No. 17192909.
(Continued)

*Primary Examiner* — Alison L Hindenlang
*Assistant Examiner* — Alexander A Wang
(74) *Attorney, Agent, or Firm* — Wenderoth, Lind & Ponack, L.L.P.

(57) ABSTRACT

A method of finding a target conveying capacity of a pumping includes a temperature-control flow through a temperature-control channel carried out according to a control variable by using a throttle as an actuating element such that a temperature-control volume flow remains substantially constant. A conveying flow of the pumping system is measured, and a pump starting from a starting conveying capacity independent of the control of the temperature-control volume flow is driven such that a conveying capacity of the pumping system is reduced to a reduced conveying capacity. Then, a check is made to find whether the conveying flow remains substantially constant and, if this is the case, the reduced conveying capacity is determined to be the target conveying capacity. If this is not the case despite the (Continued)

control of the temperature-control volume flow, the starting conveying capacity is determined to be the target conveying capacity.

20 Claims, 2 Drawing Sheets

(51) Int. Cl.
*B29C 33/04* (2006.01)
*B29C 45/76* (2006.01)
*B29C 45/73* (2006.01)
*B29C 35/00* (2006.01)
*B29C 35/16* (2006.01)
*F04D 13/06* (2006.01)
*G05D 7/06* (2006.01)
*G05D 23/19* (2006.01)

(52) U.S. Cl.
CPC .............. *B29C 35/16* (2013.01); *B29C 45/73* (2013.01); *B29C 45/76* (2013.01); *F04D 13/0686* (2013.01); *F04D 15/0022* (2013.01); *F04D 15/0088* (2013.01); *G05D 7/0617* (2013.01); *G05D 23/19* (2013.01); *B29C 2035/1616* (2013.01)

(56) References Cited

U.S. PATENT DOCUMENTS

| 2014/0004222 | A1 | 1/2014 | Sørensen et al. |
| 2014/0217632 | A1 | 8/2014 | Raschke et al. |
| 2014/0264990 | A1 | 9/2014 | Hollriegl et al. |
| 2015/0370262 | A1* | 12/2015 | Hanaoka ............... F04B 49/065 137/557 |

FOREIGN PATENT DOCUMENTS

| CN | 103328137 | 9/2013 |
| DE | 100 64 783 | 5/2002 |
| DE | 102015008371 | 1/2016 |
| EP | 1250992 | 10/2002 |
| EP | 1 970 146 | 9/2008 |
| EP | 2762290 | 8/2014 |
| EP | 2781335 | 9/2014 |

OTHER PUBLICATIONS

Search Report dated Dec. 20, 2018 in Chinese Patent Application No. 201710949666.5.

* cited by examiner

METHOD FOR FINDING A TARGET CONVEYING CAPACITY OF A PUMPING SYSTEM

BACKGROUND OF THE INVENTION

The present invention relates to a method for finding a target conveying capacity of a pumping system having at least one pump for conveying a temperature-control medium through at least one temperature-control channel of a molding tool by the pump. The present invention relates also to a pumping system for conveying a temperature-control medium through at least one temperature-control channel of a molding tool.

Molding tools, which are used in molding machines, such as, for example, injection molding machines, injection presses, presses and the like, must in many cases be temperature-controlled, that is, must be specifically cooled or heated.

This temperature control can be achieved by conveying a temperature-control medium through corresponding temperature-control channels, which pass through the molding tool. In many cases, a plurality of temperature-control channels are thereby used and it is known to control the temperature-control volume flow through the individual temperature-control channels, for example, according to the volume flow, the pressure drop, the temperature difference or the like. For this purpose, throttles are available in the individual temperature-control channels as actuating elements for the control.

It was then disclosed in AT 513870 A1 also to control a pump, which supplies the temperature-control system with a temperature-control medium. By controlling the pump such that at least one of the throttles is almost completely open, the pump can be operated at an energy-saving operating point.

The corresponding system is more complex than before due to the added control and therefore is in need of improvement in this respect.

SUMMARY OF THE INVENTION

It is therefore the object of the invention to provide a method and a device, which permit a determination of the target conveying capacity in a simplified manner.

This object is achieved in respect to a method including the following process steps:
a) control at least of one temperature-control volume flow through the at least one temperature-control channel using at least one throttle as an actuating element such that the at least one temperature-control volume flow remains substantially constant,
b) conveying flow of the pumping system is measured,
c) the at least one pump is driven starting from a starting conveying capacity independent of the control of the at least one temperature-control volume flow such that the conveying capacity of the pumping system is reduced to a reduced conveying capacity, and
d) then it is checked whether the conveying flow remains substantially constant and:
  i. if this is the case (the conveying flow remains substantially constant), the reduced conveying capacity is determined to be the target conveying capacity or,
  ii. if this is not the case (the conveying flow does not remain substantially constant) despite the control of the at least one temperature-control volume flow, the starting conveying capacity is determined to be the target conveying capacity.

Alternatively or additionally, process steps c) and d) can be carried out in the following specificity:
c) the at least once pump is driven from the starting conveying capacity independent of the control of the at least one temperature-control volume flow such that a conveying capacity of the pumping system is increased to an increased conveying capacity, and
d) then it is checked whether the conveying flow remains substantially constant and:
  i. if this is not the case (the conveying flow does not remain substantially constant) despite the control of the at least one temperature-control volume flow, the increased conveying capacity is determined to be the target conveying capacity or,
  ii. if this is the case, the starting conveying capacity is determined to be the target conveying capacity.

Through the two specifications of the method according to the present invention, the target conveying capacity can be determined starting from a starting conveying capacity which is too high or too low for the at least one temperature-control volume flow.

Furthermore, the object can be achieved in that the drive device for the pumping system is designed:
to drive the at least one pump starting from a starting conveying capacity independent of a separate control at least of one temperature-control volume flow such that a conveying capacity of the pumping system is reduced to a reduced conveying capacity, and
then to check whether the conveying flow remains substantially constant and:
  i. if this is the case (the conveying flow remains substantially constant), to determine the reduced conveying capacity to be a target conveying capacity or,
  ii. if this is not the case, to determine the starting conveying capacity to be the target conveying capacity.

Alternatively or additionally, the drive device is designed:
to drive the at least one pump starting from a starting conveying capacity independent of a separate control at least of one temperature-control volume flow according to a control variable such that a conveying capacity of the pumping system is increased to an increased conveying capacity, and
then to check whether the conveying flow remains substantially constant and:
  i. if this is not the case (the conveying flow does not remain substantially constant), to determine the increased conveying capacity to be a target conveying capacity or,
  ii. if this is the case, to determine the starting conveying capacity to be the target conveying capacity.

Through the two specifications of the pumping system according to the present invention, the target conveying capacity can be determined starting from a starting conveying capacity which is too high or too low for the at least one temperature-control volume flow.

An important aspect of the invention consists in the realization that the pumping system can be driven independent of a control of the temperature-control volume flow such that an optimized value can be found for a target conveying capacity of the pumping system.

Thus, the drive of the pumping system can be completely decoupled from a control circuit for the at least one temperature-control volume flow, which clearly provides for a simplification of the control or regulation of the pumping system.

A value range for the temperature-control volume flow can serve as a criterion for the constancy of the temperature-control volume flow, which the temperature-control volume flow is not allowed to leave, in order to be considered to be constant. This value range can, for example, be given by an average value and limit values for the deviation therefrom.

This criterion can also be used in order to determine the constancy of the conveying flow.

The control according to process step a) or the measurement of the conveying flow according to process step b) can be carried out constantly, that is continuously or "pulsed", that is, at regular or irregular intervals.

At the same time, it can be important that both before as well as after the implementation of the process step c) a control is carried out according to process step a) and/or a measurement according to process step b), in order to be able to detect a possible change of the conveying flow.

Process step d) including i and ii is carried out after process step c).

Water or oil can be used, for example, as a temperature-control medium.

To drive the pumping system such that a conveying capacity is reduced, the conveying capacity of one or several pumps of the pumping system can be reduced. Alternatively or additionally, one or several pumps of the pumping system can be completely switched off.

After determining the target conveying capacity, the pumping system can be operated with this target conveying capacity.

The at least one temperature-control volume flow itself can be used as a control variable for the control of the at least one temperature-control volume flow. Alternatively or additionally, temperature differences, return temperatures, heat quantities, flow velocities and the like can be used for variables in known physical and/or mathematical relationship with the temperature-control volume flow.

Preferably, the measurement of the conveying flow of the pumping system is carried out by a sensor upstream and/or downstream of the pumping system. This makes possible a relatively simple determination of the conveying flow. The sensor can, for example, be designed as a volume flow sensor. Alternatively or additionally, upstream and downstream temperature sensors, pressure sensors or sensors can be used for variables in a known relationship physically and/or mathematically with the variables.

However, the measurement of the conveying flow of the pumping system can be carried out as part of the control of the at least one temperature-control volume flow. Structurally, this alternative is less complex, since no additional volume flow sensors are necessary.

A combination of the measurement of the conveying flow by its own sensors or sensors for the control of the temperature-control volume flow, for example, by averaging or the like can also be advantageous.

Particularly preferably, the process steps c) and d) including i. and ii. are carried out repeatedly, and in each case the target conveying capacity from the preceding implementation is used as the starting conveying capacity. By the repeated implementation of the method according to the present invention, the effect of the invention can be reinforced and an energy-saving target conveying capacity can be found.

By terminating the process, if the case ii. occurs, an almost optimal value for the target conveying capacity can be determined (apart from the "step length" for the reduction of the conveying capacity of the pumping system).

The method according to the present invention can be started by an operator, by the latter indicating the starting conveying capacity, for example, by assumption of a current conveying capacity of the pumping system, if the latter is already in operation. Thus, the operator can start the optimization process in a very simple manner.

An automatic optimization can also be achieved in that the method according to the present invention is started when the conveying capacity of the pumping system experiences substantially no change over a predetermined time period. A value range can serve as criterion for the fact that the conveying capacity "experiences substantially no change", wherein the conveying capacity is regarded as having no change, when it does not leave the value range. The value range can be given, for example, by means of an average value and limit values for a maximum deviation therefrom.

Particularly preferably, more than one temperature-control channel is available, and a distributor is provided which distributes the conveying flow conveyed by the pumping system to the different temperature-control channels. In each of the temperature-control channels, a throttle can thereby be provided as an actuating element for the control of the at least one temperature-control volume flow. These throttles can—just as measuring devices for providing the returned variable for the control of the at least one temperature-control volume flow—be integrated into the distributor. In particular, the throttles can be controlled independently of one another.

Protection is also sought for a molding machine with a pumping system according to the present invention, and for a temperature-control device with a pumping system according to the present invention.

The term 'temperature-control device' is understood to mean devices, which independent of the molding tool and the molding machine can constitute a source for the temperature control of the molding tool and/or parts of the molding machine.

In particular, temperature-control devices can have a heating device for heating the conveying flow of the pumping system. Of course, alternatively or additionally, a cooling device for cooling the conveying flow can also be provided.

Temperature-control devices can be designed for the supply of an individual production unit or molding machine.

Temperature-control devices can be mobile.

The drive device for the pumping system can be integrated into a central machine control of the molding machine, or can be provided separately from the central machine control. The same applies to a control device for the control of the temperature-control volume flow.

BRIEF DESCRIPTION OF THE DRAWINGS

Further advantages and details of the invention result by means of the figures as well as the associated figure descriptions, in which.

DETAILED DESCRIPTION OF THE INVENTION

Figure 1:
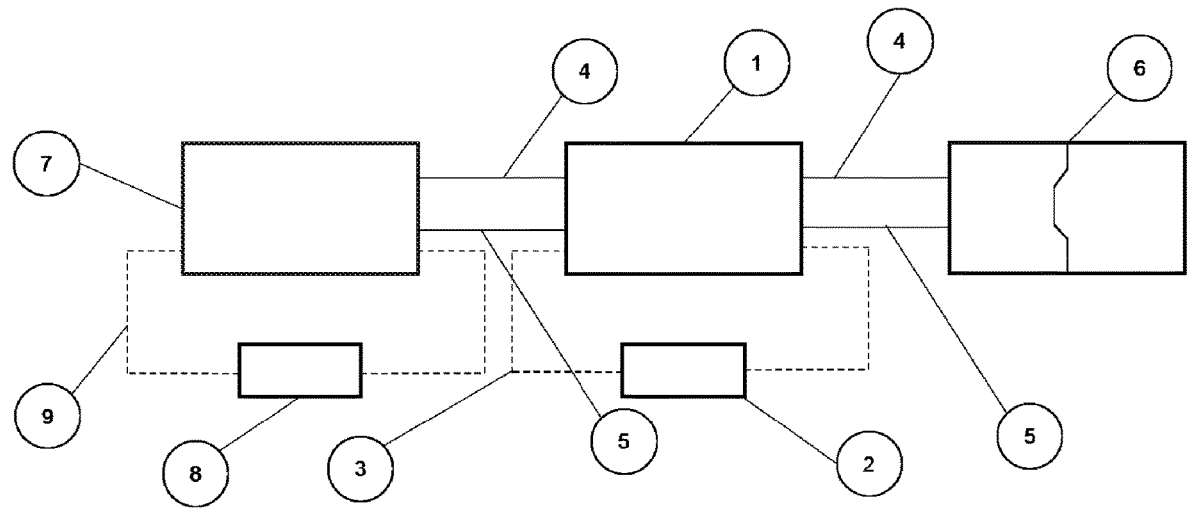
FIG. 1 shows a rough overview of a pumping system according to the present invention together with a molding tool.

In FIG. 1, the pumping system 7, the distributor 1 as well as the molding tool 6 are depicted schematically. The pumping system 7 conveys a temperature-control medium (for example, water, if necessary with additives) through the flow line 5 of the temperature-control channels and through the molding tool 6 and back via the return line 4 of the temperature-control channels. Of course, the system can also be designed to be open, that is, with a tank. The drive device 8 is connected with the pumping system 7 via an interface 9. The drive device 8 drives the pumps 10 (see FIG. 2) of the pumping system 7 via the interface 9. Moreover, measured values are transmitted by volume flow sensors 11 (see also FIG. 2) via the interface 9 to the drive device 8. A control device 2 is assigned to the distributor 1. There is also an interface 3, via which the control device 2 receives measured values of the volume flow sensors 11 in the temperature-control channels. The control device 2 uses the measured values of the volume flow sensors 11 as returned variables for the control of the temperature-control volume flows. Throttles thereby serve as actuating elements, which are arranged in the temperature-control channels and are controlled independently from the pumping system and from one another.

Figure 2:
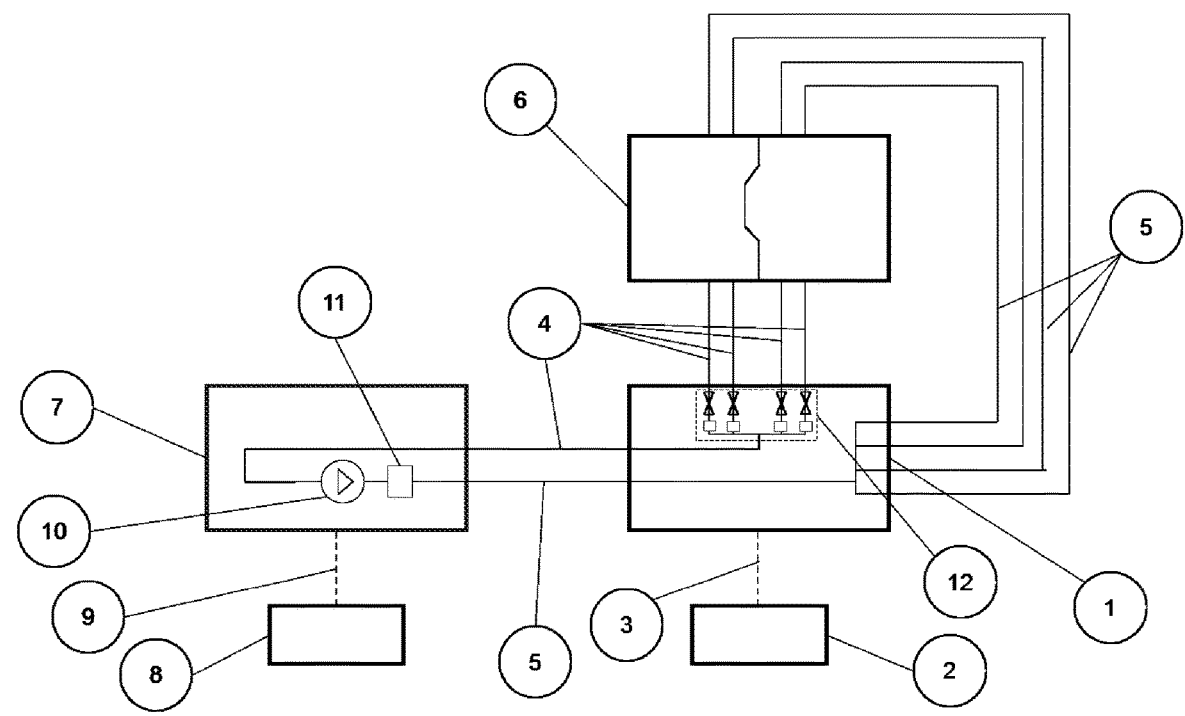
FIG. 2 shows a more detailed depiction of the embodiment according to FIG. 1.

In FIG. 2 the blocks from FIG. 1 are depicted in more detail.

In the present case, the pumping system 7 has a pump 10 as well as volume flow sensors 11 for sensing the conveying flow of the pumping system 7.

Instead of the volume flow sensors 11, alternatively or additionally, upstream and downstream pressure sensors and/or temperature sensors could be used. Of course, any sensors can be used for sensing the conveying flow, which measure one or several variables, which are in a known physical and/or mathematical relationship to the conveying flow.

The measurement of the conveying capacity of the pumping system 7 can take place, for example, via the electrical power consumption of the drives of the pumps 10. Of course, it is also readily possible to measure both the conveying flow of the pumping system 7 as well as the pressure drop, and to calculate the conveying capacity therefrom.

In the distributor 1, it is depicted how the flow line 5 of the temperature-control channels is divided into here purely by way of example four temperature-control channels. In the distributor 1, moreover, the return lines 4 are combined again into a single return line 4 and fed to the pumping system 7.

In the return line 4, moreover, the measuring devices and actuating elements (throttles) are provided for the control of the temperature-control volume flows. These are indicated collectively with the reference number 12. (The temperature-control volume flows themselves are used as control variables.)

In this embodiment, the pumping system 7 is part of a temperature-control device which is not depicted.

Figure 3:
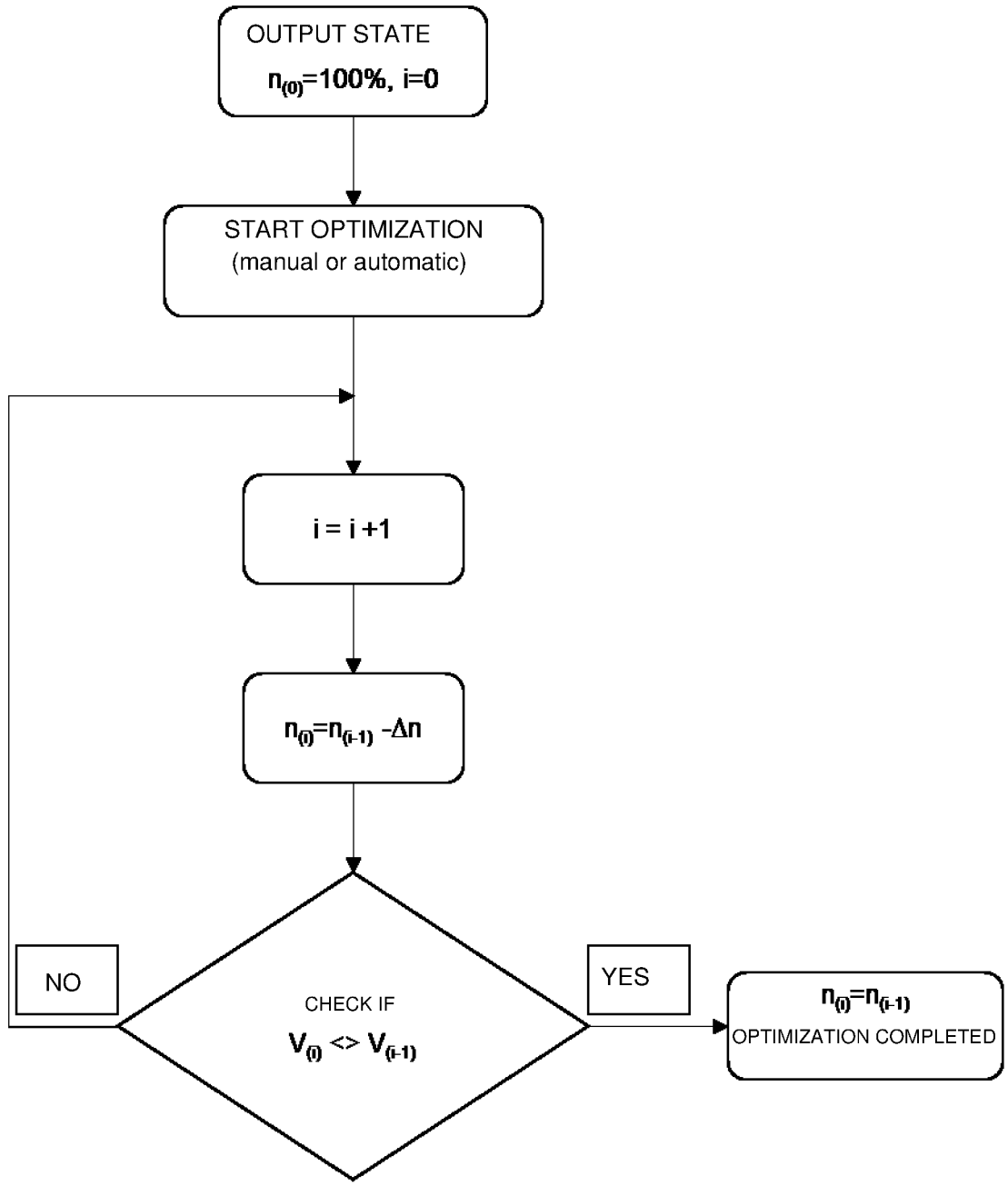
FIG. 3 is a flow diagram for illustration of the method according to the present invention.

In FIG. 3, a flow diagram is depicted which illustrates a method according to the present invention. In the initial state, a speed-regulated (alternatively: controlled) pump is operated, for example, with a starting conveying capacity ($n_{(0)}=100\%$).

Then the optimization is started—either by an operator or automatically. It is noted that the first iteration of the method is carried out, or more generally that the method is in the iteration step i+1. This is indicated by "i=i+1".

Then, the conveying capacity is reduced by decreasing the rotational speed of the drive for the pump 10 by $\Delta n$. It is then checked whether the conveying flow $V_{(i)}$ experiences a reduction in the respective step. If this is not the case, a further iteration of the method can be started. If this is already the case, the optimization has ended and the rotational speed in the previous step is used to establish the target conveying capacity.

Of course, the method according to the present invention can be carried out not only with speed-controlled pumps. The changes of the conveying capacity of the pumping system can also take place with variable displacement pumps (then controlled and/or regulated according the pump speed and/or pump adjustment angle) or by switching off pumps of the pumping system.

The invention claimed is:

1. A pumping system for conveying a temperature-control medium through at least one temperature-control channel of a molding tool, the pumping system comprising:
   a pump;
   a drive device configured to drive the pump; and
   a volume flow sensor configured to measure a conveying capacity of the pumping system, and to transmit measured values to the drive device;
   wherein the drive device is further configured to:
   drive the pump starting from a starting conveying capacity independent of a separate control of at least one temperature-control volume flow according to a control variable such that a conveying capacity of the pumping system is reduced to a reduced conveying capacity,
   then check whether a conveying flow remains substantially constant, and
   i) if the conveying flow remains substantially constant, determine the reduced conveying capacity to be a target conveying capacity, or
   ii) if the conveying flow does not remain substantially constant, determine the starting conveying capacity to be the target conveying capacity.

2. The pumping system according to claim 1, further comprising a distributor configured to distribute the conveying flow to a plurality of temperature-control channels.

3. The pumping system according to claim 2, wherein the temperature-control channels are parallel-connected.

4. The pumping system according to claim 2, wherein each of the temperature-control channels has a throttle configured to perform as an actuating element for controlling the at least one temperature-control volume flow.

5. A molding machine comprising the pumping system according to claim 1.

6. The molding machine according to claim 5, further comprising a central machine control, wherein the drive device of the pumping system is integrated into the central machine control.

7. The molding machine according to claim 5, further comprising a central machine control, wherein the drive device of the pumping system is separate from the central machine control.

8. The molding machine according to claim 5, further comprising a central machine control and a control device configured to control the at least one temperature-control volume flow, wherein the control device is integrated into the central machine control of the molding machine.

9. The molding machine according to claim 5, further comprising a central machine control and a control device configured to control the at least one temperature-control volume flow, wherein the control device is separate from the central machine control of the molding machine.

10. A temperature-control device comprising the pumping system according to claim 1.

11. A pumping system for conveying a temperature-control medium through at least one temperature-control channel of a molding tool, the pumping system comprising:
   a pump;
   a drive device configured to drive the pump; and
   a volume flow sensor configured to measure a conveying capacity of the pumping system, and to transmit measured values to the drive device;
   wherein the drive device is further configured to:
      drive the pump starting from a starting conveying capacity independent of a separate control of at least one temperature-control volume flow according to a control variable such that a conveying capacity of the pumping system is increased to an increased conveying capacity,
      then check whether the conveying flow remains substantially constant, and
      i) if the conveying flow does not remain substantially constant, determine the increased conveying capacity to be a target conveying capacity, or
      ii) if the conveying flow remains substantially constant, determine the starting conveying capacity to be the target conveying capacity.

12. The pumping system according to claim 11, further comprising a distributor configured to distribute the conveying flow to a plurality of temperature-control channels.

13. The pumping system according to claim 12, wherein the temperature-control channels are parallel-connected.

14. The pumping system according to claim 12, wherein each of the temperature-control channels has a throttle configured to perform as an actuating element for controlling the at least one temperature-control volume flow.

15. A molding machine comprising the pumping system according to claim 11.

16. The molding machine according to claim 15, further comprising a central machine control, wherein the drive device of the pumping system is integrated into the central machine control.

17. The molding machine according to claim 15, further comprising a central machine control, wherein the drive device of the pumping system is separate from the central machine control.

18. The molding machine according to claim 15, further comprising a central machine control and a control device configured to control the at least one temperature-control volume flow, wherein the control device is integrated into the central machine control of the molding machine.

19. The molding machine according to claim 15, further comprising a central machine control and a control device configured to control the at least one temperature-control volume flow, wherein the control device is separate from the central machine control of the molding machine.

20. A temperature-control device comprising the pumping system according to claim 11.

* * * * *